United States Patent
Brita et al.

(10) Patent No.: US 7,427,653 B2
(45) Date of Patent: Sep. 23, 2008

(54) CATALYST COMPONENTS FOR THE POLYMERIZATION OF OLEFINS

(75) Inventors: Diego Brita, Ferrara (IT); Gianni Collina, Ferrara (IT); Giampiero Morini, Padua (IT); Gianni Vitale, Ferrara (IT)

(73) Assignee: Basell Poliolefine Italia S.p.A, Milan (IT)

( * ) Notice: Subject to any disclaimer, the term of this patent is extended or adjusted under 35 U.S.C. 154(b) by 0 days.

(21) Appl. No.: 10/537,077

(22) PCT Filed: Nov. 25, 2003

(86) PCT No.: PCT/EP03/13807

§ 371 (c)(1),
(2), (4) Date: Jun. 1, 2005

(87) PCT Pub. No.: WO2004/055065

PCT Pub. Date: Jul. 1, 2004

(65) Prior Publication Data

US 2006/0089251 A1    Apr. 27, 2006

Related U.S. Application Data

(60) Provisional application No. 60/435,195, filed on Dec. 20, 2002.

(30) Foreign Application Priority Data

Dec. 18, 2002  (EP) .................................. 02080616

(51) Int. Cl.
*C08F 4/42*    (2006.01)
(52) U.S. Cl. ....................... 526/124.2; 526/75; 526/122; 526/123.1; 526/124.3; 526/209; 526/348; 502/103; 502/104; 502/123; 502/126; 502/127; 502/134

(58) Field of Classification Search ............... 526/75, 526/122, 123.1, 124.2, 124.3, 209, 348; 502/103, 502/104, 123, 126, 127, 134
See application file for complete search history.

(56) References Cited

U.S. PATENT DOCUMENTS

| | | | |
|---|---|---|---|
| 4,124,532 A | 11/1978 | Giannini et al. | 252/429 B |
| 4,220,554 A | 9/1980 | Scatá et al. | 252/429 B |
| 4,298,718 A | 11/1981 | Mayr et al. | 526/125 |
| 4,336,360 A | 6/1982 | Giannini et al. | 526/114 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |
| 4,829,034 A | 5/1989 | Iiskolan et al. | 302/9 |
| 5,055,535 A | 10/1991 | Spitz et al. | 526/142 |
| 5,100,849 A | 3/1992 | Miya et al. | 502/9 |
| 5,733,987 A | 3/1998 | Covezzi et al. | 526/65 |
| 7,091,289 B2 | 8/2006 | Wang et al. | |

FOREIGN PATENT DOCUMENTS

| | | | |
|---|---|---|---|
| CN | 2002120861 | | 6/2002 |
| EP | 0 004 647 A2 | * | 10/1979 |
| EP | 0004647 | | 10/1979 |
| EP | 0389173 | | 9/1990 |
| EP | 0 416 928 A2 | * | 3/1991 |
| EP | 0416928 | | 3/1991 |
| EP | 0661301 | | 7/1995 |
| WO | 9221706 | | 12/1992 |
| WO | 9303078 | | 2/1993 |
| WO | WO 93/03078 | * | 2/1993 |
| WO | 9844009 | | 10/1998 |
| WO | 2004/033504 | | 4/2004 |

* cited by examiner

*Primary Examiner*—Ling-Siu Choi
(74) *Attorney, Agent, or Firm*—Jarrod N. Raphael

(57) ABSTRACT

A catalyst component for olefin (co)polymerization, and in particular for the preparation of LLDPE, comprising Mg, Ti, halogen and an electron donor compound (ED) belonging to ethers, esters, amines, ketones, or nitriles, characterized in that the molar ratio Mg/Ti is higher than 5, and the molar ratio ED/Ti is higher than 3.5. The said catalyst components display a homogeneous distribution of the comonomer in and among the copolymer chains.

32 Claims, No Drawings

CATALYST COMPONENTS FOR THE POLYMERIZATION OF OLEFINS

This application is the U.S. national phase of International Application PCT/EP2003/013807, filed Nov. 25, 2003, claiming priority to European Patent Application No. 02080616.2 filed Dec. 18, 2002, and the benefit under 35 U.S.C. 119(e) of U.S. Provisional Application No. 60/435,195, filed Dec. 20, 2002; the disclosures of International Application PCT/EP2003/013807, European Patent Application 02080616.2, and U.S. Provisional Application No. 60/435,195, each as filed, are incorporated herein by reference.

The present invention relates to catalyst components for the polymerization of olefins $CH_2=CHR$, wherein R is hydrogen or a hydrocarbon radical having 1-12 carbon atoms. In particular, the present invention relates to catalyst components comprising Mg, Ti, halogen and an electron donor compound in specified molar ratios. These catalyst components, when converted into a catalyst, are particularly suitable for the preparation of copolymers of ethylene with α-olefins due to their capability of homogeneously distribute the olefins along the polymer chain and among the various polymer chains.

Accordingly, another object of the present invention is the use of said catalysts in a process for the copolymerization of olefins in order to produce ethylene/α-olefin copolymers.

Linear low-density polyethylene (LLDPE) is one of the most important families of products in the polyolefin field. The family comprises ethylene/α-olefin copolymers containing an amount of α-olefin deriving units such as to have products with a density in the range 0.925-0.88. Due to their characteristics, these copolymers find application in many sectors and in particular in the field of wrapping and packaging of goods where, for example, the use of stretchable films based on LLDPE constitutes an application of significant commercial importance. LLDPE is commercially produced with liquid phase processes (solution or slurry) or via the more economical gas-phase process. Both processes involve the widespread use of Ziegler-Natta $MgCl_2$-supported catalysts that are generally formed by the reaction of a solid catalyst component, in which a titanium compound is supported on a magnesium halide, with a suitable activator usually an alkylaluminium compound.

As far as the preparation of LLDPE is concerned, said catalysts are required to show good comonomer distribution suitably coupled with high yields.

The homogeneous distribution of the comonomer (α-olefin) in and among the polymer chains is very important. In fact, having a comonomer randomly or alternatively distributed along the polymer chain and, at the same time, having the polymer fractions with a similar average content of comonomer (narrow distribution of composition) allows the achievement of high quality ethylene copolymers. These latter usually combine, at the same time, a density sufficiently lower with respect to HDPE and a low content of polymer fractions soluble in hydrocarbon solvents like hexane or xylene which worsen certain properties of the said copolymers.

In view of the above, it would be very important for the catalysts to be used in LLDPE preparation to show a good ability to homogeneously distribute the comonomer as explained above. As the above mentioned heterogeneous Ziegler-Natta catalysts generally are not particularly satisfactory in doing so, the general attempt is that of trying to improve this characteristic by using the so called electron donor compounds.

U.S. Pat. No. 4,142,532 discloses catalyst components for the polymerization of olefins obtained by metal complexes of formula $Mg_mTiCl_{2m}Y \cdot nE$ in which Y is one atom or group of atoms satisfying the valence of Ti and E is an electron donor compound. Specific examples of these complexes are for example those obtained by the reaction of $TiCl_3$ with $MgCl_2$ and electron donors such as ethyl acetate, ethanol, or tetrahydrofurane. In the said document these catalyst components have never been used for the copolymerization of olefins but only in the homopolymerization process. Moreover, from the figures reported it is possible to see that the specific activities (KgPE/gcat·atm·h) are very low.

In EP 004647 is disclosed a catalyst component for the preparation of ethylene copolymers under gas-phase polymerization conditions, comprising a precursor of formula $Mg_mTi(OR)_nX_pED_q$, in which m is from 0.1 to 56, n is 0, 1 or 2, p is from 2 to 116 and q is from 2 to 85. Preferably m is from 1.5 to 5, q is from 4 to 11 and the ED is preferably chosen among esters, ethers and ketones. The activities are not particularly high and supportation on silica is needed in order to impart the necessary morphological characteristics to the catalyst for the gas-phase operability.

It is therefore felt the need of a catalyst displaying ability to give a homogeneous comonomer distribution, a high polymerization activity and preferably a suitability for the gas-phase polymerization.

The applicant has now found a catalyst component for olefin polymerization, and in particular for the preparation of LLDPE, comprising Mg, Ti, halogen and an electron donor compound (ED) belonging to ethers, esters, amines, ketones, or nitrites characterized in that the molar ratio Mg/Ti is higher than 5, and the molar ratio'ED/Ti is higher than 3.5.

The above electron donor compounds can also be used in mixture with each other or with different electron donor compounds such as alcohols, anhydrides etc. For the purpose of calculating the ED/Ti ratio however, only the ED belonging to ethers, esters, amines, ketones, and nitrites has to be taken into consideration.

Preferably the ED compound is selected among ethers or esters. Preferred ethers are the C2-C20 aliphatic ethers and in particulars cyclic ethers preferably having 3-5 carbon atoms cyclic ethers such as tetrahydrofurane, dioxane. Preferred esters are the alkyl esters of C1-C20, preferably C1-C10 aliphatic carboxylic acids and in particular C1-C4 alkyl esters of aliphatic mono carboxylic acids such as ethylacetate and methyl formiate.

The ED/Ti molar ratio preferably ranges from 3.7 to 40, more preferably from 4 to 40 and especially from 4.5 to 30. Also the ranges from 5 to 20 and in particular the range from 6 to 15 are especially preferred.

The Mg/Ti molar ratio ranges preferably from 7 to 120 preferably from 10 to 110 and more particularly from 15 to 100.

In a particular embodiment of the present invention, the catalyst component comprises, in addition to the electron donor compound (ED), a Ti compound and a magnesium dihalide in amounts such that the above disclosed molar ratios are satisfied. Preferred titanium compounds are the tetrahalides or the compounds of formula $TiX_n(OR^1)_{4-n}$, where $0 \leq n \leq 3$, X is halogen, preferably chlorine, and $R^1$ is $C_1$-$C_{10}$ hydrocarbon group. Titanium tetrachloride is the preferred compound.

The magnesium dihalide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The catalyst components of the invention can be prepared according to several methods. According to one of these methods, the magnesium dichloride in an anhydrous state and the suitable amount of ED are milled together under conditions in which activation of the magnesium dichloride occurs. The so obtained product can be treated one or more times with a suitable amount of $TiCl_4$. This treatment is followed by washings with hydrocarbon solvents until chloride ions disappeared.

According to a particular embodiment, the solid catalyst component can be prepared by reacting a suitable amount titanium compound of formula $Ti(OR^1)_{n-y}X_y$, where n is the valence of titanium and y is a number between 1 and n, preferably $TiCl_4$, with a magnesium chloride deriving from an adduct of formula $MgCl_2 \cdot pR^2OH$, where p is a number between 0.1 and 6, preferably from 2 to 4.5, and $R^2$ is a hydrocarbon radical having 1-18 carbon atoms, in the presence of suitable amount of the ED compound. The adduct can be suitably prepared in spherical form by mixing alcohol and magnesium chloride in the presence of an inert hydrocarbon immiscible with the adduct, operating under stirring conditions at the melting temperature of the adduct. Then, the emulsion is quickly quenched, thereby causing the solidification of the adduct in form of spherical particles. A particularly suitable method for preparing the catalyst according to the invention, particularly suitable for the gas-phase polymerization, comprises the following steps:

(a) reacting a compound $MgCl_2 \cdot mR^3OH$, wherein $0.3 \leq m \leq 2.3$ and $R^3$ is an alkyl, cycloalkyl or aryl radical having 1-12 carbon atoms, with a dealcoholating agent and with the ED compound and (b) reacting the product obtained from (a) with a titanium compound of the formula $Ti(OR^1)_nX_{y-n}$, in which n is comprised between 0 and 0.5, y is the valence of titanium, X is halogen and R is an alkyl radical having 2-8 carbon atoms or a COR group.

The adduct $MgCl_2 \cdot mR^3OH$ can be prepared by thermal dealcoholation of adducts $MgCl_2 \cdot pEtOH$, wherein p is equal to or higher than 2 and preferably ranging from 2.5 to 4.5. Said adducts, in spherical form, can be prepared from molten adducts by emulsifying them in liquid hydrocarbon and thereafter solidifying them by quick cooling. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034. As mentioned above the so obtained adducts are subjected to thermal dealcoholation at temperatures comprised between 50 and 150° C. until the alcohol content is reduced to values lower than 2.5 and preferably comprised between 1.7 and 0.3 moles per mole of magnesium dichloride.

In step (a) the dealcoholating agent can be any chemical agent having functionalities capable to react with the OH groups. A particularly preferred group of dealcoholating agents is that of alkyl aluminum compounds. Particularly preferred is the use of the trialkyl aluminum compounds such as for example triethylaluminum, triisobutylaluminum, tri-n-butylaluminum, tri-n-hexylaluminum, tri-n-octylaluminum and tris(2,4,4-trimethyl-pentyl)aluminum. Use of triethylaluminum is especially preferred. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

It is known that alkylaluminum compounds can have a reducing activity with respect to the Ti compounds. Accordingly, if this activity is undesired, a deactivating agent, for instance $O_2$, can be added before carrying out the step (b) and thus avoiding the reduction of the titanium compound.

Another group of usable dealcoholating agent is that of halogen-containing silicon compounds. Specific examples of such silicon compounds include the silicon halides having formula $SiX_{4-n}Y_n$, in which X and Y represent halogen atoms, e.g., Cl and Br, and n is a number varying from zero to 3. The use of $SiCl_4$ is particularly preferred.

As mentioned above, the step (a) comprise also the reaction with the ED compound which can be carried out according to various modalities. According to one procedure, the reaction of the dealcoholating agent with the adduct is carried out in the presence of the ED compound. The said ED can be added to the reaction mixture together with the dealcoholating agent or, in alternative, separately. If the ED is added together with the dealcoholating agent it constitutes a preferred embodiment the preparation of a separate mixture of the two components that are successively fed to the reaction mixture of step (a). Either or both the dealcoholating agent and the ED compound can be added as such or, preferably, diluted in a liquid carrier such as for example a liquid hydrocarbon. The reaction step (a) can be carried out in a liquid hydrocarbon at a temperature between −10° C. and 130° C. Preferably the reaction is carried out at a temperature between 20 and 100° C. The molar ratio between the dealcoholating compound and the alcohol of adduct generally ranges from 0.01 to 100 and particularly from 0.1 to 50. When an Al-alkyl compound is used as dealcoholating agent, its molar ratio with the alcohol of the adduct preferably ranges from 0.01 to 70 and preferably from 0.1 to 40. The ED compound can be used in amounts such as to have molar ratios Mg/ED in the range of 0.1 to 20 preferably from 0.5 to 10. Although not strictly required, step (a) can be repeated one or more times. According to a preferred embodiment of the present invention, if the dealcoholating agent and the ED are combined as a separate mixture and then reacted with the adduct, the reaction step (a) is carried out three times. One preferred class of ED usable according to this procedure is that of ethers and in particular cyclic aliphatic ethers. Among them, tetrahydrofurane is particularly preferred.

According to another particular procedure, the reaction with the ED compound is carried out after the reaction between the $MgCl_2 \cdot mROH$ and the dealcoholating agent has been completed and, optionally, the reaction product separated. This procedure is particularly suitable in the cases in which the dealcoholating agent can react with the ED compound. Both cyclic aliphatic ethers and esters of aliphatic carboxylic acids such as acetates can be advantageously used according to this procedure.

The product coming from step (a) is then reacted, in step (b) with the said Ti compound. Also in this case the reaction can be carried out in a liquid hydrocarbon as a solvent and at a temperature between −10° C. and 135° C., preferably between 20 and 130° C. The amount of Ti compound used should be such as to have, in the final catalyst component, a molar Mg/Ti and a molar ED/Ti ratio according to the present invention. As an example, the applicant has found that good results in terms of catalyst performances can be obtained by using a weight amount of Ti compound ranging from 0.01 to 1% of the weight of the MgCl$_2$·mROH adduct of step (a).

An alternative method which is also preferred, comprises the use of a titanium halide, preferably titanium tetrachloride, as a delcoholating agent and the subsequent contact of the resulting solid with the ED compound in the proper amount. The titanium halide and the ED can be used under the same conditions illustrated above.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1-12 carbon atoms, comprising the product of the reaction between:
(a) a solid catalyst component as described above,
(b) an alkylaluminum compound and, optionally,
(c) an external electron donor compound.

The alkyl-Al compound can be preferably selected from the trialkyl aluminum compounds such as for example trimethylaluminum (TMA), triethylaluminum (TEAL), triisobutylaluminum (TIBA)), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylalmiunum's with alkylaluminum halides. Among them mixtures between TEAL and DEAC are particuallry preferred. The use of TIBA, alone or in mixture is also preferred. Particularly preferred is also the use of TMA.

The external electron donor compound can be equal to or different from the ED used in the solid catalyst component. Preferably it is selected from the group consisting of ethers, esters, amines, ketones, nitriles, silanes and mixtures of the above. In particular it can advantageously be selected from the C2-C20 aliphatic ethers and in particulars cyclic ethers preferably having 3-5 carbon atoms cyclic ethers such as tetrahydrofurane, dioxane.

In addition, the electron donor compound can also be advantageously selected from silicon compounds of formula R$_a^5$R$_b^6$Si(OR$^7$)$_c$, where a and b are integers from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 0, c is 3, R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane.

The above mentioned components (a)-(c) can be fed separately into the reactor where, under the polymerization conditions can exploit their activity. It constitutes however a particular advantageous embodiment the pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins CH$_2$=CHR, where R is H or a C1-C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The pre-polymerized catalyst component can also be subject to a further treatment with a titanium compound before being used in the main polymerization step. In this case the use of TiCl$_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours. Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed. In a particular embodiment, the gas-phase process can be suitably carried out according to the following steps:

(i) contacting the catalyst components (a), (b) and optionally (c) for a period of time ranging from 0.1 to 120 minutes, at a temperature ranging from 0 to 90° C.; optionally
(ii) pre-polymerizing with one or more olefins of formula CH$_2$=CHR, where R is H or a C1-C10 hydrocarbon group, up to forming amounts of polymer from about 0.1 up to about 1000 g per gram of solid catalyst component (a); and
(iii) polymerizing in the gas-phase ethylene, or mixtures thereof with α-olefins CH$_2$=CHR in which R is a hydrocarbon radical having 1-10 carbon atoms, in one or more fluidized or mechanically stirred bed reactors, in the presence of the product coming from (i) or (ii).

As already mentioned, the catalysts of the present invention are particularly suitable for preparing linear low density polyethylenes (LLDPE, having a density lower than 0.940 g/cm$^3$) and very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%. As shown in the examples below, said copolymers are generally characterized by low amount of xylene solubles fraction in respect of the extent of comonomer incorporation and density. In many cases, particularly when an external donor is used, the comonomer is also well distributed in and among the chain as shown by the substantial lowering of the density even in respect of relatively minor amount of comonomer introduced.

The said catalysts can also be used to prepare a broader range of polyolefin products including, for example, high density ethylene polymers (HDPE, having a density higher than 0.940 g/cm$^3$), comprising ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70%; isotactic polypropylenes and crystalline copolymers of propylene and ethylene and/or other alpha-olefins having a content of units derived from propylene of higher than 85% by weight; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight.

The following examples are given in order to further describe the present invention in a non-limiting manner.

Characterization

Melt Index: measured at 190° C. according to ASTM D-1238 condition "E" (load of 2.16 Kg) and "F" (load of 21.6 Kg);

Fraction soluble in xylene. The solubility in xylene at 25° C. was determined according to the following method: About 2.5 g of polymer and 250 mL of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Comonomer Content

1-Butene was determined via Infrared Spectrometry.

The α-olefins higher than 1-butene were determined via Infra-Red analysis.

Effective density: ASTM-D 1505

Blocking Force: determined on a 25 μm blown film (blown up ratio 2.5/1) according to ASTM D3354.

Dart: determined on a 25 μm blown film (blown up ratio 2.5/1) according to ASTM D1709

EXAMPLES

Preparation of the Spherical Support (Adduct $MgCl_2$/EtOH)

A magnesium chloride and alcohol adduct containing about 3 mols of alcohol was prepared following the method described in example 2 of U.S. Pat. No. 4,399,054, but working at 2000 RPM instead of 10000 RPM.

Example 1

Preparation of the Solid Component

The spherical support, prepared according to the general method underwent a thermal treatment, under $N_2$ stream, over a temperature range of 50-150° C. until spherical particles having a residual ethanol content of about 35% (1.1 mole of ethanol for each $MgCl_2$ mole) were obtained.

Into a 2 l glass reactor provided with stirrer, were introduced 1.2 l of hexane 60 g of the support prepared as described above and, at temperature of 0° C., 0.27 l of a 1.3 molar mixture $AlEt_3$/THF which has been prepared separately ([Al]=100 g/L in hexane). The whole mixture was heated and kept under stirring for 30 minutes at a 50° C. After that stirring was discontinued and the liquid siphoned off. The treatment with the $AlEt_3$/THF mixture was repeated twice under the same conditions starting from room temperature. Three washings with fresh hexane were performed and then a further treatment in 1 liter of hexane with 4 mL of $TiCl_4$ (added diluted in 200 mL of hexane) was performed under stirring for 2 h at a temperature of 60° C.

The solid, that was washed with anhydrous hexane, and then dryied under vacuum at about 50° C., showed the following characteristics:

| Total titanium | 2.1% (by weight) |
| Mg | 18.2% (by weight) |
| Cl | 48.6% (by weight) |
| THF | 13.8% (by weight) |
| Al | 0.8% (by weight) |
| EtOH | 14.3% (by weight) |

Therefore, the Mg/Ti molar ratio in this catalyst component is 17 and the THF/Ti molar ratio is 4.4.

Example 2

Preparation of the Solid Component

The spherical support, prepared according to the method described in Example 1, underwent a thermal treatment, under $N_2$ stream, over a temperature range of 50-150° C. until spherical particles having a residual ethanol content of about 35% (1.1 mole of ethanol for each $MgCl_2$ mole) were obtained.

Into a 1000 l steel reactor provided with stirrer, were introduced 700 L of hexane, 24.5 Kg of the support prepared as described above and, at temperature of 0° C., 120 l of a 1.3 molar mixture $AlEt_3$/THF which has been prepared separately ([Al]=100 g/L in hexane). The whole mixture was heated and kept under stirring for 30 minutes at a 50° C. After that stirring was discontinued and the liquid siphoned off. The treatment with the $AlEt_3$/THF mixture was repeated twice under the same conditions starting from room temperature. Five washes with fresh hexane were performed and then a further treatment in 700 L of hexane with 0.43 L of $TiCl_4$ (added diluted in 10 L of hexane) was performed under stirring for 2 h at a temperature of 60° C. After 2 washings with anhydrous hexane, the spherical solid component was obtained. After drying under vacuum at about 50° C., the solid showed the following characteristics:

| Total titanium | 0.7% (by weight) |
| Mg | 15.2% (by weight) |
| Cl | 48.3% (by weight) |
| THF | 15.2% (by weight) |
| Al | 0.7% (by weight) |
| EtOH | 7.0% (by weight) |

Therefore, the Mg/Ti molar ratio in this catalyst component is 43 and the THF/Ti molar ratio is 14.5.

Example 3

Preparation of the Solid Component

The spherical support, prepared according to the method described in Example 1, underwent a thermal treatment, under $N_2$ stream, over a temperature range of 50-150° C. until spherical particles having a residual ethanol content of about 25% (0.8 mole of ethanol for each $MgCl_2$ mole) were obtained.

Into a 1000 l steel reactor provided with stirrer, were introduced 700 L of hexane, 35 Kg of the support prepared as described above and, at temperature of 0° C., 110 L of a 1.3 molar mixture AlEt$_3$/THF which has been prepared separately ([Al]=100 g/L in hexane). The whole mixture was heated and kept under stirring for 30 minutes at a 50° C. After that stirring was discontinued and the liquid siphoned off. The treatment with the AlEt$_3$/THF mixture was repeated twice under the same conditions starting from room temperature. Five washes with fresh hexane were performed and then a further treatment in 700 L of hexane with 0.65 L of TiCl$_4$ (added diluted in 10 L of hexane) was performed under stirring for 2 h at a temperature of 60° C.

After 2 washings with anhydrous hexane, the spherical solid component was obtained. After drying under vacuum at about 50° C., the solid showed the following characteristics:

| | |
|---|---|
| Total titanium | 0.4% (by weight) |
| Mg | 17.5%% (by weight) |
| Cl | 51.9% (by weight) |
| THF | 10.3% (by weight) |
| Al | 0.2% (by weight) |
| EtOH | 12.8% (by weight) |

Therefore, the Mg/Ti molar ratio in this catalyst component is 86.7 and the THF/Ti molar ratio is 17.

Example 4

Preparation of the Solid Component

The spherical support, prepared according to the method described in Example 1, underwent a thermal treatment, under N$_2$ stream, over a temperature range of 50-150° C. until spherical particles having a residual ethanol content of about 35% (1.1 mole of ethanol for each MgCl$_2$ mole) were obtained.

Into a 600 L steel reactor provided with stirrer, were introduced 300 L of hexane, 15 Kg of the support prepared as described above and, at temperature of 0° C., 6.5 Kg of AlEt$_3$ ([Al]=100 g/L in hexane). The whole mixture was heated and kept under stirring for 30 minutes at a 50° C. After that stirring was discontinued and the liquid siphoned off. Three washes with fresh hexane were performed and then a further treatment in 220 L of hexane with 3.5 L of THF at temperature of 50° C. for 30' was performed. After that stirring was discontinued and the liquid siphoned off Three washes with fresh hexane were performed and then, a further treatment in 220 L of hexane with 0.61 L of TiCl$_4$ (added diluted in 10 l of hexane) was performed under stirring for 2 h at a temperature of 60° C. At last, after 1 washing with anhydrous hexane, the spherical solid component was recovered. After drying under vacuum at about 50° C., the solid showed the following characteristics:

| | |
|---|---|
| Total titanium | 1.3% (by weight) |
| Mg | 13.8% (by weight) |
| Cl | 45.3% (by weight) |
| THF | 11.0% (by weight) |
| Al | 2.7% (by weight) |
| EtOH | 19.2% (by weight) |

Therefore, the Mg/Ti molar ratio in this catalyst component is 21 and the THF/Ti molar ratio is 5.6.

Example 5

Preparation of the Solid Component

The spherical catalyst (800 g), prepared according to the example 3 was introduced into a 60-Litres steel reactor provided with stirrer in 20 L of hexane.

Keeping the internal temperature at 0° C., 40 g of AlEt$_3$ ([Al]=100 g/L in hexane) were slowly added in the reactor and after few minutes, ethylene was fed to get a monomer consumption of 800 g. After 2 washings with anhydrous hexane, the spherical solid component was obtained.

Example 6

Preparation of the Solid Component

The spherical catalyst (800 g), prepared according to the example 2 was introduced into a 60-L steel reactor provided with stirrer in 20 L of hexane.

Keeping the internal temperature at 0° C., 40 g of AlEt$_3$ ([Al]=100 g/L in hexane) were slowly added in the reactor and after few minutes, ethylene was fed to get a monomer consumption of 800 g. After 2 washings with anhydrous hexane, the spherical solid component was obtained.

Example 7

Preparation of the Solid Component

The spherical catalyst (500 g), prepared according to the example 3 was introduced into a 5 L glass reactor provided with stirrer, where previously 2.9 L of OB22 oil (commercially available) and 25 g of AlEt2Cl ([Al]=100 g/L in OB22 oil) were introduced. Keeping constant at room temperature, the slurry was stirred for 30', and then discharged for following tests.

Example 8

Preparation of the Solid Component

The spherical support, prepared according to the general method, underwent a thermal treatment, under N$_2$ stream, over a temperature range of 50-150° C. until spherical particles having a residual ethanol content of about 46% (1.8 mole of ethanol for each MgCl$_2$ mole) were obtained.

Into a 1 L glass reactor provided with stirrer, 400 mL of heptane 24.6 g of the support prepared as described above were introduced. The suspension was cooled down to −20° C., and 410 mL of a heptane solution containing AlEt$_3$ and THF (Al=THF=1.5 mol/mol, [Al]=108 g/L in heptane) was fed in 60 minutes under stirring. After the addition the suspension was stirred for 60 minutes at a −20° C.

Then the stirring was discontinued and the liquid siphoned off. The solid was washed twice with heptane. Heptane (400 mL) was added and 7.5 mL of TiCl$_4$ was fed under stirring. The suspension was stirred for 1 h at −20° C., the stirring was discontinued and the liquid siphoned off. The solid was washed three times with heptane.

At 25° C., heptane (200 mL) was added and 77.7 mL of a heptane solution containing AlEt$_3$ and THF (Al/THF=1 mol/mol, [Al]=108 g/L in heptane) was fed dropwise under stirring. The suspension was then warmed up to 50° C. and stirred for 60 minutes.

The stirring was discontinued, the liquid siphoned off and the spherical solid component was washed three times with hexane, and, after drying under vacuum at about 50° C., the solid showed the following characteristics:

| | |
|---|---|
| Total titanium | 1.6% (by weight) |
| Mg | 13.0% (by weight) |
| THF | 18.0% (by weight) |

Therefore, the Mg/Ti molar ratio in this catalyst component is 15.6 and the THF/Ti molar ratio is 7.3.

Example 9

Preparation of the Solid Component

The spherical support, prepared according to the general method, underwent a thermal treatment, under $N_2$ stream, over a temperature range of 50-150° C. until spherical particles having a residual ethanol content of about 46% (1.8 mole of ethanol for each $MgCl_2$ mole) were obtained.

Into a 1-l glass reactor provided with stirrer, 400 mL of heptane 20. g of the support prepared as described above were introduced. The suspension was cooled down to −20° C., and 333 mL of a heptane solution containing $AlEt_3$ and THF (Al/THF=1.5 mol/mol, [Al]=108 g/L in heptane) was fed in 60 minutes under stirring. After the addition the suspension was stirred for 60 minutes at a −20° C.

Then the stirring was discontinued and the liquid siphoned off. The solid was washed twice with heptane. Heptane (400 mL) was added and 6.1 mL of $TiCl_4$ was fed under stirring. The suspension was stirred for 1 h at −20° C., the stirring was discontinued and the liquid siphoned off. The solid was washed three times with heptane.

At 25° C., heptane (200 mL) was added and 44.5 mL of a heptane solution containing $AlMe_3$ and THF (Al/THF=1 mol/mol, [Al]=100 g/L in heptane) was fed dropwise under stirring. The suspension was then warmed up to 50° C. and stirred for 60 minutes.

The stirring was discontinued, the liquid siphoned off and the spherical solid component was washed three times with hexane, and, after drying under vacuum at about 50° C., the solid showed the following characteristics:

| | |
|---|---|
| Total titanium | 1.6% (by weight) |
| Mg | 13.7% (by weight) |
| THF | 16.4% (by weight) |

Therefore, the Mg/Ti molar ratio in this catalyst component is 16.6 and the THF/Ti molar ratio is 6.7.

Example 10

Preparation of the Solid Component

The spherical support, prepared according to the general method, underwent a thermal treatment, under $N_2$ stream, over a temperature range of 50-150° C. until spherical particles having a residual ethanol content of about 46% (1.8 mole of ethanol for each $MgCl_2$ mole) were obtained.

Into a 1 L glass reactor, 500 mL of Toluene and 25 g of the support prepared as described above were introduced. The suspension was cooled to 0° C., 43 mL of $SiCl_4$ were fed in 15 minutes. The suspension was heated to 90° C. in 1 hour and then reacted for 3 hours.

2.3 mL of Ethyl Acetate and 20 mL of $TiCl_4$ were added and the mixture reacted at 100° C. for 1 hour The stirring was discontinued, the liquid siphoned off and the spherical solid component was washed three times with hexane, and, after drying under vacuum at about 50° C., the solid showed the following characteristics:

| | |
|---|---|
| Total titanium | 0.7% (by weight) |
| Mg | 21.3% (by weight) |
| AcOEt | 6.4% (by weight) |

Therefore, the Mg/Ti molar ratio in this catalyst component is 59.8 and the AcOEt/Ti molar ratio is 4.98.

Example 11

Preparation of the Solid Component

The spherical support, prepared according to the general method, underwent a thermal treatment, under $N_2$ stream, over a temperature range of 50-150° C. until spherical particles having a residual ethanol content of about 46% (1.8 mole of ethanol for each $MgCl_2$ mole) were obtained.

Into a 1 l glass reactor, 500 mL of Toluene and 25 g of the support prepared as described above were introduced. The suspension was cooled to 0° C., 43 mL of $SiCl_4$ and 3.5 mL of Ethyl Acetate were fed in 15 minutes. The suspension was heated to 90° C. in 1 hour and then reacted for 3 hours.

55 mL of $TiCl_4$ were added and the mixture reacted at 100° C. for 1 hour.

The stirring was discontinued, the liquid siphoned off and the spherical solid component was washed three times with hexane, and, after drying under vacuum at about 50° C., the solid showed the following characteristics:

| | |
|---|---|
| Total titanium | 0.9% (by weight) |
| Mg | 20.2% (by weight) |
| AcOEt | 11.7% (by weight) |

Therefore, the Mg/Ti molar ratio in this catalyst component is 44.4 and the AcOEt/Ti molar ratio is 7.1.

Example 12

Preparation of the Solid Component

Into a 500 mL four-necked round flask, purged with nitrogen, 250 mL of $TiCl_4$ were introduced at 0° C. Then, at the same temperature, 17.5 g of a spherical $MgCl_2$/EtOH adduct containing 25% wt of ethanol (prepared as described above and then subject to a thermal treatment, under $N_2$ stream, over a temperature range of 50-150° C. until spherical particles reached the desired alcohol content) were added under stirring. The temperature was raised to 130° C. in 1 h and maintained for 60 min. Then, the stirring was discontinued, the solid product was allowed to settle and the supernatant liquid was siphoned off.

The solid was washed six times with anhydrous hexane (5×100 mL) at 60° C. and once at 25° C. Finally, the solid was dried under vacuum and analyzed (Ti=4.9% wt; Mg=19.4% wt).

In a 500 mL four-necked round flask equipped with a mechanical stirrer and purged with nitrogen, 200 mL of anhydrous hexane and 10 g of the titanium containing solid obtained as disclosed above were charged at room temperature. At the same temperature, under stirring an amount of AcOEt achieve a molar AcOEt/Ti ratio of 4 was added dropwise. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, dried under vacuum and analyzed obtaining the following results

| Total titanium | 3.7% (by weight) |
| Mg | 15.2% (by weight) |
| AcOEt | 27% (by weight) |

Therefore, the Mg/Ti molar ratio in this catalyst component is 8.3 and the AcOEt/Ti molar ratio is 4.1.

Examples 13-16

A series of catalyst components was prepared using different electron donor (ED) compounds in the same procedure described in Ex. 12. The specific ED compound used and the composition of the catalyst components is reported in table 1.

Example 17

A $MgCl_2$ precursor was prepared by following the procedure described in example 1(a) of U.S. Pat. No. 4,220,554. The so obtained solid (17 g) was then treated with an excess (250 mL) of $TiCl_4$ at 120° for 1 hour followed by further two $TiCl_4$ treatments at 120° C. (30 minutes). The solid was washed twice with anhydrous hexane (2×100 mL) at 60° C. and twice at 25° C. Finally, the solid was dried under vacuum and analyzed (Ti=5.8% wt; Mg=18.8% wt). The contact step with AcOEt was carried out at according to the general procedure. The characteristics of the catalyst component are reported in Table 1.

Example 18

The solid intermediate (Ti =4.9% wt; Mg =19.4% wt) prepared according to example 12 was injected into an autoclave and kept at 30° C. stirring in anhydrous hexane (the concentration of the solid was 40 g/L) under nitrogen atmosphere. The suspension was treated with an amount of a 10% wt solution of tri-ethyl-aluminium (TEA) in hexane to achieve a ratio TEA/solid =0.5 wt/wt. An amount of propylene equal to 0.7 times the initial quantity of the solid was then slowly fed with a rate suitable to keep the temperature constant at 30° C. After 30 minutes the polymerization was stopped. The solid was washed 3 times with anhydrous hexane at 25° C., and suspended again in hexane and treated with AcOEt as the ID compound following the same procedure disclosed in example 12 with the difference that a AcOEt/Ti ratio of 8 was used. The characteristics of the catalyst component are reported in Table 1.

Example 19

The catalyst component was prepared according to the same procedure disclosed in Example 13-16 using AcOEt as electron donor with the difference that the contact was carried out at 100° C. in heptane instead of hexane. The characteristics of the catalyst component are reported in Table 1.

Example 20

The catalyst was prepared according to the same procedure disclosed in Examples 13-16 using AcOEt as electron donor with the difference that the contact step was carried out for two times. The first one was carried out at AcOEt/Ti feed molar ratio of 1 for 30 minutes, in the second, carried out after having washed the solid with hexane, the AcOEt/Ti feed molar ratio was 4 and the contact lasted 2.5 hours. The characteristics of the catalyst component are reported in Table 1.

Example 21

The catalyst component was prepared according to the same procedure disclosed in Examples 13-16 using AcOEt as electron donor with the difference that the starting $MgCl_2$ (EtOH) adducts had an alcohol content of 35% by weight. The characteristics of the catalyst component are reported in Table 1.

Example 22

Ethylene/1-butene Copolymerization

A 4.5 liter stainless-steel autoclave equipped with a magnetic stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (amount as reported in table 2), ethylene (7.0 bar, partial pressure) and hydrogen (2.0 bar, partial pressure).

In a 100 $cm^3$ three neck glass flask were introduced in the following order, 50 $cm^3$ of anhydrous hexane, the amount of cocatalyst and optionally external donor reported in Table 1), and the solid catalyst of example 1 (amount reported in table 1). They were mixed together and stirred at room temperature for 20 minutes and then introduced in the reactor through the steel vial by using a nitrogen overpressure.

Under continuous stirring, the total pressure was maintained constant at 75° C. for 120 minutes by feeding ethylene. At the end the reactor was depressurised and the temperature was dropped to 30° C. The recovered polymer was dried at 70° C. under a nitrogen flow and weighted. The polymerization conditions and the relative results are shown in Table 2.

Examples 23-29

Ethylene/1-butene Copolymerizations

The copolymerizations were carried out according to the procedure disclosed in Example 22 by using the catalyst component prepared in example 2. The specific polymerization conditions and the relative results are reported in Table 2.

Example 30

Ethylene/1-butene Copolymerization

The copolymerization was carried out according to the procedure disclosed in Example 22 with the difference that the catalyst component prepared in example 4 was used. The specific polymerization conditions and the relative results are reported in Table 2.

Example 31-32

The copolymerizations were carried out according to the procedure disclosed in Example 22 with the difference that the catalyst component prepared in example 8 was used. The specific polymerization conditions and the relative results are reported in Table 2.

Example 33

The copolymerization was carried out according to the procedure disclosed in Example 22 with the difference that the catalyst component prepared in example 9 was used. The specific polymerization conditions and the relative results are reported in Table 2.

Example 34

The copolymerization was carried out according to the procedure disclosed in Example 22 with the difference that the catalyst component prepared in example 10 was used. The specific polymerization conditions and the relative results are reported in Table 2.

Example 35

The copolymerization was carried out according to the procedure disclosed in Example 22 with the difference that the catalyst component prepared in example 11 was used. The specific polymerization conditions and the relative results are reported in Table 2.

Example 36

Ethylene/1-butene Copolymerization in Gas-Phase

A 15.0 liter stainless-steel fluidized reactor equipped with gas-circulation system, cyclone separator, thermal exchanger, temperature and pressure indicator, feeding line for ethylene, propane, 1-butene, hydrogen, and with a 1 L steel reactor for the catalyst pre-polymerization and/or injection of the catalytic system into the fluidized bed reactor.

The gas-phase apparatus was purified by fluxing pure nitrogen at 40° C. for 12 hours and then was circulated a propane (10 bar, partial pressure) mixture containing 1.0 g of TMA at 80° C. for 30 minutes. It was then depressurized and the reactor washed with pure propane, heated to 75° C. and finally loaded with propane (9.7 bar partial pressure), 1-butene (1.4 bar, partial pressure), ethylene (5.4 bar, partial pressure) and hydrogen (1.4 bar, partial pressure). In a 100 mL three neck glass flask were introduced in the following order, 20 mL of anhydrous hexane, 0.6 g of TMA, 0.1 g of the catalyst (prepared according to the example 2) and THF in such an amount to give an Al/donor molar ratio of 5. They were mixed together and stirred at room temperature for 5 minutes and then introduced in the 1-L reactor maintained in a propane flow.

By using a propane overpressure, the activated catalyst was injected into the gas-phase reactor. The final pressure was about 18 bar, and it was kept constant during the polymerization at 75° C. for 180 minutes by feeding a 6% wt. 1-butene/ethene mixture.

At the end, the reactor was depressurised and the temperature was dropped to 30° C. The collected polymer was dried at 70° C. under a nitrogen flow and weighted.

The ethylene copolymer showed a butene-1 content of 5.4%, a MIE of 0.86, a density of 0.9238 and a xylene soluble content of 3.5%.

Examples 37-44

The polymerization process was carried out in a plant working continuously and basically equipped with a small reactor (pre-contacting pot) in which the catalyst components are mixed to form the catalytic system, a loop reactor receiving the catalytic system formed in the previous step (prepolymerization section running in propane slurry phase), and one fluidized bed reactor (polymerization reactor).

Except as reported in table 2, the following reactants are fed to the pre-contacting pot:
the solid catalyst component prepared as described in one of the previous examples
liquid propane as diluent
a solution of aluminum alkyl compound
THF as external electron donor
small amount of propylene The temperature is normally in the range of 10-60° C. and the residence time ranges from 10 to 40 minutes. The so obtained catalytic system was directly fed from the pre-contacting pot to the gas-phase fluidized bed reactor operated at 75° C. and under a total pressure of 24 bar. In this reactor, a second amount of $AlR_3$ can be added as reported in Table 3 where further polymerization conditions are illustrated.

In the examples 37 and 41 the catalytic system coming from the pre-contacting pot is first fed into the loop reactor kept at temperatures ranging from 20 to 50° C. The residence time in the loop was about 40 minutes and no additional reactants were added during this step. After that time the product was discharged from the loop reactor and transferred to the fluidized bed reactor working under the conditions reported above.

In the example 41, the polymer produced in the first gas-phase reactor was transferred to a second gas-phase reactor working under conditions reported in table 4.

In all the runs the polymer discharged from the final reactor was dried at 70° C. under a nitrogen flow and weighted. The polymer properties are reported in table 5.

Example 45

Into a 10 liters stainless steel autoclave, degassed under $N_2$ stream at 70° C., 4 liters of anhydrous hexane, 20 mg of catalyst of example 12 (previously prepolymerized in 25 g of propylene at 20° for 45 minutes) 0.5 g of triethylaluminum (TEA) and an amount of cyclohexylmethyldimethoxy silane (CMMS) such as to give an Al/CMMS molar ratio of 60 were introduced. The whole was stirred, heated to 75° C. and thereafter 3 bar of $H_2$ and 7 bar of ethylene were fed. During the polymerization ethylene was fed to keep the pressure constant. After 3 hours the polymerization was discontinued and the collected polymer was dried at 70° C. under a nitrogen flow. The activity with respect to the catalyst contained in the pre-polymer was 7.7 kg/g cat. The NE of the polymer was 0.34, the IF/MIE ratio was 23.5.

Example 46

The same polymerization test was repeated using the same amount of dicyclopentyldimethoxy silane instead of CMMS. The activity with respect to the catalyst contained in the pre-polymer was 9.2 kg/g cat. The MIE of the polymer was 0.53, the IF/MIE ratio was 22.3.

Examples 47-55

The copolymerizations were carried out according to the procedure disclosed in Example 22. Specific conditions and results are reported in table 6.

TABLE 1

| | | Catalyst preparation | | | | | | |
|---|---|---|---|---|---|---|---|---|
| | | ED/Ti | Catalyst composition | | | | | |
| | | feed | Mg | Ti | Cl | ED | ED/Ti | Mg/Ti |
| Ex. | ED | m.r | wt. % | wt. % | wt. % | Wt. % | m.r | m.r |
| 12 | Ethyl acetate | 4 | 15.2 | 3.7 | 52 | 27 | 4.1 | 8.3 |
| 13 | Acetonitrile | 4 | 19 | 4.7 | 61 | 14.9 | 3.7 | 7.9 |
| 14 | Diethylamine | 4 | 16.9 | 3.4 | 55.9 | 18.5 | 3.6 | 9.8 |
| 15 | Triethylamine | 4 | 14.5 | 3.3 | 53 | 28.5 | 4.2 | 8.5 |
| 16 | Acetylacetone | 4 | 15.1 | 3.2 | 52.1 | 29 | 4.3 | 9.5 |
| 17 | Ethyl acetate | 4 | 14.7 | 3.6 | 51.1 | 28.2 | 4.2 | 8 |
| 18 | " | 4 | 10.1 | 2.3 | nd | 24 | 5.7 | 8.6 |
| 19 | " | 4 | 16.5 | 4.1 | 49.4 | 26 | 3.4 | 7.9 |
| 20 | " | 1 + 4 | 14 | 2.9 | 47 | 31.9 | 6.0 | 9.5 |
| 21 | " | 4 | 14.1 | 4.2 | na | 29.8 | 3.9 | 6.6 |

TABLE 2

| | | Polymerization Conditions | | | | | | Characterization | | |
|---|---|---|---|---|---|---|---|---|---|---|
| EX. | Cat. mg | Cocatalyst Type/g. | E.D. Type | Cocat/E.D. m. ratio | $C_4^-$ g | $H_2$ bar | MIE | $C_4$ % wt | Density | Xylene Solubles % wt |
| 22 | 21 | TMA/0.6 | THF | 5 | 180 | 1.5 | 0.51 | 7.3 | 0.9193 | 4 |
| 23 | 22 | TMA/0.6 | THF | 5 | 180 | 1.5 | 1.7 | 11.4 | 0.9114 | 17.4 |
| 24 | 21 | TMA/0.6 | THF | 5 | 220 | 1.5 | 0.35 | 7.1 | 0.9192 | 6 |
| 25 | 20.5 | TMA/0.6 | THF | 5 | 150 | 1.5 | 0.35 | 6.5 | 0.9212 | 4.3 |
| 26 | 21 | TMA/0.6 | THF | 8 | 180 | 1.5 | 0.76 | 7.4 | 0.9181 | 6.3 |
| 27 | 21. | TMA/0.6 | THF | 5 | 180 | 1.5 | 1.5 | 8.9 | 0.9173 | 8.9 |
| 28 | 22 | TMA/DEAC/0.6 | THF | 5 | 180 | 1.5 | 0.7 | 6.9 | 0.9193 | 6 |
| 29 | 22 | TMA/0.6 | THF | 5 | 180 | 1.5 | 1.6 | nd | 0.9240 | 4.1 |
| 30 | 20 | TMA/0.6 | T | 15 | 200 | 2 | 1 | 5.3 | 0.9294 | 5.6 |
| 31 | 20 | TMA/0.6 | THF | 5 | 150 | 2 | 0.8 | 4.3 | 0.9260 | 1.34 |
| 32 | 20 | TMA/0.6 | — | — | 100 | 1 | 0.6 | 10.5 | 0.9195 | 9.2 |
| 33 | 20 | TEA/0.67 | — | — | 150 | 1.5 | 1.3 | 6.7 | 0.9260 | 8.2 |
| 34 | 20 | TMA/06 | THF | 5 | 200 | 2 | 1 | 9.0 | 0.918 | 9.2 |
| 35 | 20 | TMA/06 | THF | 5 | 200 | 2 | 0.9 | 9.3 | 0.917 | 9 |

T = thexyltrimethoxysilane
THF = tetrahydrofurane
TMA = trimethylaluminum
TEAL = triethylaluminum
DEAC = diethylaluminumchloride

TABLE 3

| | | Pre-contacting pot | | | | | | Fluidized bed reactor | | | | | | | |
|---|---|---|---|---|---|---|---|---|---|---|---|---|---|---|---|
| | Cat. as | | | Propyl./ | | $AlR_3$/ | | Loop reactor | | | | $H_2$/ $C_2H_4$ | $C_4H_8$/ ($C_4H_8$ + | | Mile- |
| EX. n° | example | cat. (g/h) | T (°C.) | Cat (g/g) | $AlR_3$ | Cat. (g/g) | THF (g/h) | T (°C.) | τ (min) | $AlR_3$/(g/h) | $C_2H_4$ (mol %) | (mol/ mol) | $C_2H_4$) (mol/mol) | τ (min) | Yield (Kg/h) | age (g/g) |
| 37 | 2 | 10 | 50 | 1.5 | TMA | 3 | 6 | 50 | 42 | TMA/10 | 29 | 0.21 | 0.38 | 180 | 25 | 2500 |
| 38 | 2 | 10 | 25 | | absent | | | absent | | TEAL/40 | 32 | 0.13 | 0.31 | 180 | 25 | 2500 |
| 39 | 2 | 10 | 20 | 3 | DEAC | 1 | absent | absent | | TEAL/30 | 30 | 0.13 | 0.28 | 180 | 25 | 2500 |
| 40 | 4 | 10 | 20 | absent | DEAC | 1 | 3 | absent | | TEAL/30 | 10 | 0.19 | 0.33 | 204 | 22 | 2200 |
| 41 | 3 | 20 | 20 | absent | DEAC | 1 | absent | 20 | 40 | TEAL/30 | 15 | 0.15 | 0.32 | 96 | — | — |
| 42 | 5 | 10 | 20 | absent | DEAC | 1 | absent | absent | | TEAL/30 | 25 | 0.15 | 0.28 | 108 | 42 | 4200 |
| 43 | 6 | 10 | 20 | absent | DEAC | 1 | absent | absent | | TEAL/30 | 29 | 0.16 | 0.28 | 114 | 40 | 4000 |
| 44 | 7 | 10 | 20 | absent | | absent | | absent | | TEAL/30 | 21 | 0.15 | 0.28 | 126 | 35 | 3500 |

TABLE 4

Second Fluidized bed reactor

| EX. N° | T (° C.) | τ (min) | AlR$_3$/(g/h) | C$_2$H$_4$ (mol %) | H$_2$/C$_2$H$_4$ (mol/mol) | C$_4$H$_8$/(C$_4$H$_8$ + C$_2$H$_4$) (mol/mol) | Yield (Kg/h) | Mileage (g/g) |
|---|---|---|---|---|---|---|---|---|
| 41 | 75 | 132 | absent | 32 | 0.29 | 0.3 | 110 | 5500 |

TABLE 5

Polymer Characterization

| EX. N° | B.D.P. (g/cc) | MIE (g/10') | F/E | Density (g/cc) | 1-butene bonded (wt %) | Xylene soluble (wt %) | Blocking (N/m) | Dart (g) |
|---|---|---|---|---|---|---|---|---|
| 37 | 0.351 | 0.90 | 28.0 | 0.9151 | 10.5 | 8.5 | 58 | 171 |
| 38 | 0.228 | 1.0 | 28.0 | 0.9169 | 10.2 | 9.9 | 91 | 157 |
| 39 | 0.241 | 0.97 | 27.0 | 0.9170 | 9.9 | 8.2 | 50 | 111 |
| 40 | 0.200 | 0.87 | 29.0 | 0.9204 | 9 | 8.9 | 40 | 136 |
| 41 | 0.308 | 0.91 | 26.0 | 0.9191 | 9.1 | 8.1 | 50 | 138 |
| 42 | 0.324 | 1.0 | 27.0 | 0.9178 | 9.6 | 7.4 | 30 | 134 |
| 43 | 0.235 | 0.89 | 26.0 | 0.9186 | 8.9 | 5.5 | 30 | 129 |
| 44 | 0.322 | 0.81 | 28.0 | 0.9195 | 8.9 | 6.1 | 70 | 94 |

TABLE 6

Polymerization conditions

| | Cat. | | Cocat. | Ext.Donor | α-olefin C$_4^-$ | H$_2$ | Polymer Characterization | | | | |
|---|---|---|---|---|---|---|---|---|---|---|---|
| | | | | Al/ED | | | Yield | C$_4^-$ | MIE | density | Tm | X.S |
| Ex. | Ex | mg | type | type | mol | g | Bar | Kg/g * h | % wt | g/10' | g/cc | ° C. | % wt |
| 47 | 13 | 19.8 | TEA | — | | — | 150 | 1 | 0.9 | 5.3 | 0.2 | 0.924 | — | 6.2 |
| 48 | 14 | 22 | TEA | — | | — | 150 | 1 | 2.2 | 10.6 | 3.5 | 0.9195 | 122.9 | 16.5 |
| 49 | 15 | 5.3 | TEA | — | | — | 150 | 1 | 7.7 | 9.8 | 2.5 | 0.9115 | 121.2 | 18.8 |
| 50 | 16 | 20 | TEA | | | | 150 | 1 | 9.5 | 16.6 | 2.2 | 0.905 | 120.5 | 29.2 |
| 51 | 17 | 9.9 | TEA | | | — | 150 | 1.5 | 8.8 | 6 | 1.1 | 0.9260 | 123.5 | 4.8 |
| 52 | 18 | 10.4 | TMA | THF | 5 | | 150 | 1.5 | 13 | 6.1 | 0.43 | 0.9189 | 121.7 | 4.8 |
| 53 | 19 | 14.8 | TMA | THF | 5 | | 150 | 1.5 | 5.1 | 5.1 | 0.3 | 0.9165 | 122.3 | 2.8 |
| 54 | 20 | 15.5 | TEA + DEAC2/1 | THF | 5 | | 180 | 1.5 | 2.3 | 8.5 | 0.7 | 0.921 | 120.6 | 6.7 |
| 55 | 21 | 15.4 | TMA | THF | 5 | | 200 | 1.5 | 15.8 | 7.2 | 0.96 | 0.921 | 122.2 | 5.7 |

The invention claimed is:

1. A solid catalyst component for the polymerization of olefins comprising Mg, a titanium compound selected from titanium tetrahalides, or of formula $TiX_n(OR^1)_{4-n}$, wherein $0 \leq n \leq 3$, X is halogen, and $R^1$ is $C_1$-$C_{10}$ hydrocarbon group, a halogen, and an electron donor compound (ED) selected from ethers, esters, amines, ketones, or nitriles, wherein a molar ratio Mg/Ti ranges from 7 to 120, and a molar ratio ED/Ti is higher than 3.5.

2. The solid catalyst component according to claim 1, in which the ED compound is selected from the group consisting of ethers, esters and ketones.

3. The solid catalyst component according to claim 2, in which the ED compound is selected from the C2-C20 aliphatic ethers.

4. The solid catalyst component according to claim 3, in which the ethers are cyclic ethers.

5. The solid catalyst component according to claim 4, in which the cyclic ethers have 3-5 carbon atoms.

6. The solid catalyst component according to claim 5, in which the cyclic ether is tetrahydrofurane.

7. The solid catalyst component according to claim 2, in which the ED compound is selected from alkyl esters of C1-C20 aliphatic carboxylic acids.

8. The solid catalyst component according to claim 7, in which the alkyl esters are selected from C1-C4 alkyl esters of aliphatic mono carboxylic acids.

9. The solid catalyst component according to claim 8, in which the alkyl ester is ethylacetate.

10. The solid catalyst component according to claim 1, in which the ED/Ti molar ratio ranges from 3.7 to 40.

11. The solid catalyst component according to claim 10, in which the ED/Ti molar ratio ranges from 4.5 to 30.

12. The solid catalyst component according to claim 1, in which the Mg atoms derive from $MgCl_2$.

13. The solid catalyst component according to claim 1, in which the Mg/Ti molar ratio ranges from 10 to 110.

14. The solid catalyst component according to claim 1, in which the Mg/Ti molar ratio ranges from 15 to 100.

15. A catalyst for the polymerization of olefins comprising a product obtained by contacting:
(a) a solid catalyst component comprising Mg, a titanium compound selected from titanium tetrahalides, or of formula $TiX_n(OR^1)_{4-n}$, wherein $0 \leq n \leq 3$, X is halogen, and R¹ is $C_1$-C10 hydrocarbon group, a halogen, and an electron donor compound (ED) selected from ethers, esters, amines, ketones, or nitriles, wherein a molar ratio Mg/Ti ranges from 7 to 120, and a molar ratio ED/Ti is higher than 3.5;
(b) at least one aluminum alkyl compound and, optionally,
(c) an external electron donor compound.

16. The catalyst according to claim 15, in which the aluminum alkyl compound is an Al trialkyl.

17. The catalyst according to claim 15, in which the aluminum alkyl compound is an aluminum alkyl halide.

18. The catalyst according to claim 15, in which the aluminum alkyl compound is a product obtained by mixing an aluminum trialkyl compound with an aluminumalkyl halide.

19. The catalyst according to claim 15, in which the external electron donor compound is a C2-C20 aliphatic ether.

20. The catalyst according to claim 19, in which the aliphatic ether is tetrahydrofurane.

21. The catalyst according to claim 15, in which the external electron donor compound is a silicon compound of formula $R_a^5 R_b^6 Si(OR^7)_c$, where a is 0, b is 1, c is 3, $R^6$ is a branched alkyl or cycloalkyl group, optionally containing heteroatoms, and $R^7$ is methyl.

22. The catalyst according to claim 15, which is obtained by pre-contacting the components (a), (b) and optionally (c) for a period of time ranging from 0.1 to 120 minutes at a temperature ranging from 0 to 90° C.

23. The catalyst according to claim 22, in which the pre-contact is carried out of in the presence of small amounts of olefins, for a period of time ranging from 1 to 60 minutes, in a liquid diluent, at a temperature ranging from 20 to 70° C.

24. The catalyst according to claim 15, which is pre-polymerized with at least one olefin of formula $CH_2$=CHR, where R is H or a C1-C10 hydrocarbon group, up to forming amounts of polymer from about 0.1 up to about 1000 g per gram of solid catalyst component (a).

25. The catalyst according to claim 15, in which the Mg/Ti molar ratio ranges from 10 to 110.

26. The catalyst according to claim 15, in which the Mg/Ti molar ratio ranges from 15 to 100.

27. A process comprising (co)polymerizing olefins $CH_2$=CHR, wherein R is hydrogen or a hydrocarbon radical having 1-12 carbon atoms, carried out in the presence of a catalyst comprising a product obtained by contacting:
(a) a solid catalyst component comprising Mg, a titanium compound selected from titanium tetrahalides, or of formula $TiX_n(OR^1)_{4-n}$, wherein $0 \leq n \leq 3$, X is halogen, and R¹ is C1-C10 hydrocarbon group, a halogen, and an electron donor compound (ED) selected from ethers, esters, amines, ketones, or nitriles, wherein a molar ratio Mg/Ti ranges from 7 to 120, and a molar ratio ED/Ti is higher than 3.5;
(b) at least one aluminum alkyl compound and, optionally,
(c) an external electron donor compound.

28. The process according to claim 27, for the preparation of an ethylene/alpha olefin copolymer having a content of alpha olefin ranging from 0.1 to 20% by mol.

29. The process according to claim 28, wherein the process is carried out in gas-phase.

30. The process according to claim 29 further comprising the following steps:
(i) contacting the catalyst components (a), (b) and optionally (c) for a period of time ranging from 0.1 to 120 minutes, at a temperature ranging from 0 to 90° C.; optionally
(ii) pre-polymerizing with at least one olefin of formula $CH_2$=CHR, where R is H or a C1-C10 hydrocarbon group, up to forming amounts of polymer from about 0.1 up to about 1000 g per gram of solid catalyst component (a); and
(iii) polymerizing in the gas-phase ethylene, or mixtures thereof with α-olefins $CH_2$=CHR in which R is a hydrocarbon radical having 1-10 carbon atoms, in at least one fluidized or mechanically stirred bed reactor, in the presence of a product formed in steps (i) or (ii).

31. The process according to claim 27, in which the Mg/Ti molar ratio ranges from 10 to 110.

32. The process according to claim 27, in which the Mg/Ti molar ratio ranges from 15 to 100.

* * * * *